US006584673B2

(12) United States Patent
Schmidt

(10) Patent No.: US 6,584,673 B2
(45) Date of Patent: Jul. 1, 2003

(54) PLANAR COMMUTATOR SEGMENT ATTACHMENT METHOD AND ASSEMBLY

(75) Inventor: Howard Schmidt, Nashua, NH (US)

(73) Assignee: McCord Winn Textron Inc., Manchester, NH (US)

( * ) Notice: Subject to any disclaimer, the term of this patent is extended or adjusted under 35 U.S.C. 154(b) by 0 days.

(21) Appl. No.: 09/962,764

(22) Filed: Sep. 25, 2001

(65) Prior Publication Data

US 2002/0067098 A1 Jun. 6, 2002

Related U.S. Application Data

(62) Division of application No. 09/629,922, filed on Jul. 31, 2000, now Pat. No. 6,359,362.

(51) Int. Cl.[7] ........................ H01R 43/06; H01R 39/16; H02K 15/00; H02K 15/02

(52) U.S. Cl. ............................. 29/597; 29/596; 29/598; 264/272.1; 310/233; 310/235

(58) Field of Search .......................... 29/414, 415, 417, 29/596, 597, 598; 264/272.1, 105; 427/123, 124; 310/233, 235, 237

(56) References Cited

U.S. PATENT DOCUMENTS

| | | | | |
|---|---|---|---|---|
| 3,530,500 A | | 9/1970 | Jensen | |
| 3,538,365 A | | 11/1970 | Reisnecker | |
| 3,777,367 A | * | 12/1973 | Kalagidis | 29/597 |
| 3,861,027 A | | 1/1975 | Allen | |
| 3,864,821 A | | 2/1975 | Ito et al. | |
| 3,983,431 A | | 9/1976 | Hancock | |
| 3,987,539 A | * | 10/1976 | Gravener | 29/597 |
| 4,358,319 A | | 11/1982 | Yoshida et al. | |
| 4,358,506 A | | 11/1982 | Intrater et al. | |
| 4,374,903 A | | 2/1983 | Intrater et al. | |

(List continued on next page.)

FOREIGN PATENT DOCUMENTS

| | | |
|---|---|---|
| DE | 89 07 045.3 | 12/1989 |
| DE | 89 07 077.7 | 12/1989 |
| EP | 0 021 891 | 1/1981 |
| FR | 2 633 781 A | 7/1989 |
| SU | 400 944 | 2/1974 |

OTHER PUBLICATIONS

J. Intrater, "Review of Some Processes For Ceramic–To–Metal Joining", *Materials & Manufacturing Processes*, 8(3), 353–373 (1993).

"Sputtering Target Bonding", *ATI Materials*. "A New Direction In Surface Analysis", TTS 100 Oryn Technology Corporation.

(List continued on next page.)

*Primary Examiner*—Carl J. Arbes
*Assistant Examiner*—Thiem D Phan
(74) *Attorney, Agent, or Firm*—Reising, Ethington, Barnes, Kisselle, P.C.

(57) ABSTRACT

A planar carbon segment commutator assembly made by forming an annular conductor substrate with an annular front projection extending integrally and axially from a front surface of the substrate. An annular carbon disk is formed on the conductor substrate by overmolding a carbon compound onto the front surface of the conductor substrate and around the annular front projection. The conductor substrate is mounted on an insulating hub. Electrically isolated, circumferentially-spaced commutator segments and corresponding mechanically interlocked conductor sections are formed by making radial cuts through the annular carbon disk and the metal substrate, respectively. According to one embodiment, each of the front projections has a greater cross-sectional area at a distal end than at a base end to mechanically lock the commutator segments onto the conductor sections.

10 Claims, 4 Drawing Sheets

U.S. PATENT DOCUMENTS

| | | | | |
|---|---|---|---|---|
| 4,396,677 A | | 8/1983 | Intrater et al. | |
| 4,510,276 A | | 4/1985 | Leech et al. | |
| 4,535,029 A | | 8/1985 | Intrater et al. | |
| 4,559,464 A | * | 12/1985 | Stokes | 29/460 |
| 5,157,299 A | | 10/1992 | Gerlach | |
| 5,175,463 A | | 12/1992 | Farago et al. | |
| 5,255,426 A | * | 10/1993 | Farago et al. | 29/597 |
| 5,386,167 A | | 1/1995 | Strobi | |
| 5,409,593 A | | 4/1995 | Moskowitz | |
| 5,422,528 A | | 6/1995 | Prahl | |
| 5,432,993 A | | 7/1995 | Strobl | |
| 5,442,849 A | | 8/1995 | Strobl | |
| 5,530,311 A | | 6/1996 | Ziegler | |
| 5,552,652 A | | 9/1996 | Shimoyama et al. | |
| 5,584,115 A | | 12/1996 | Takahashi | |
| 5,677,588 A | | 10/1997 | Strobl | |
| 5,727,307 A | | 3/1998 | Gstohl et al. | |
| 5,898,989 A | | 5/1999 | Strobl | |
| 5,912,523 A | * | 6/1999 | Ziegler et al. | 29/597 |
| 5,925,961 A | | 7/1999 | Sugiyanma | |
| 5,925,962 A | * | 7/1999 | Kobman et al. | 29/597 |
| 5,932,949 A | | 8/1999 | Ziegler et al. | |

OTHER PUBLICATIONS

"Electromagnet Systems", *ATI Magnetics*. "SurgX™ ESD Protection On Board", Oryx Technology Corporation, Feb. 1995.

James Intrater, "Intragene™ Metallization on 96% $A1_20_3$ And A1N: Solder Pull Strength Data", pp. 1–3, Oryx Technology Corporation.

James Intrater, "Intragene™ Metallization On CVD–Diamond Coated $Si_3N_4$", pp. 1–3, Oryx Technology Corporation.

James Intrater. "The Challenge of Bonding Metals to Ceramics", Technical Bulletin, Ceramic/Metal Bonding, Advanced Technology, Inc., Reprinted from *Machine Design* Nov. 23, 1989.

James Intrater, "How to Select the Right Metallization/Joining Method", Advanced Technology, Inc., Reprinted from *Ceramic Industry* Feb. 1991, *Business News Publishing Company*.

Francis W. Sears, Mark W. Zemansky, Hugh D. Young, "University Physics", Sixth Edition.

* cited by examiner

FIG-3
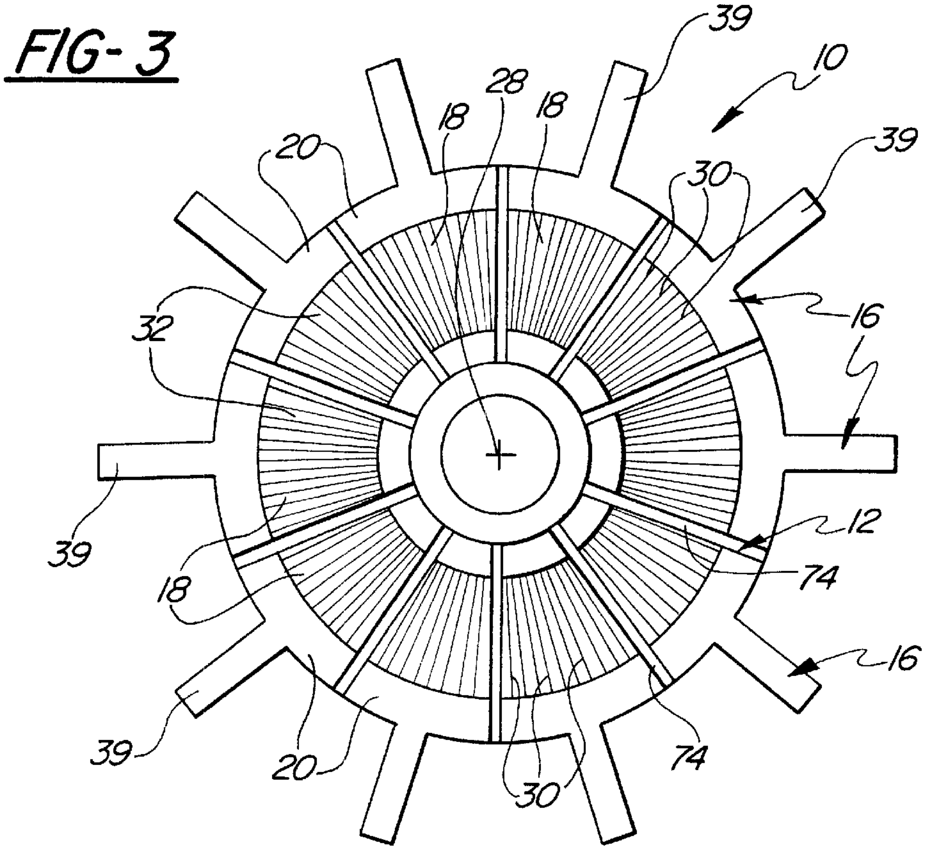
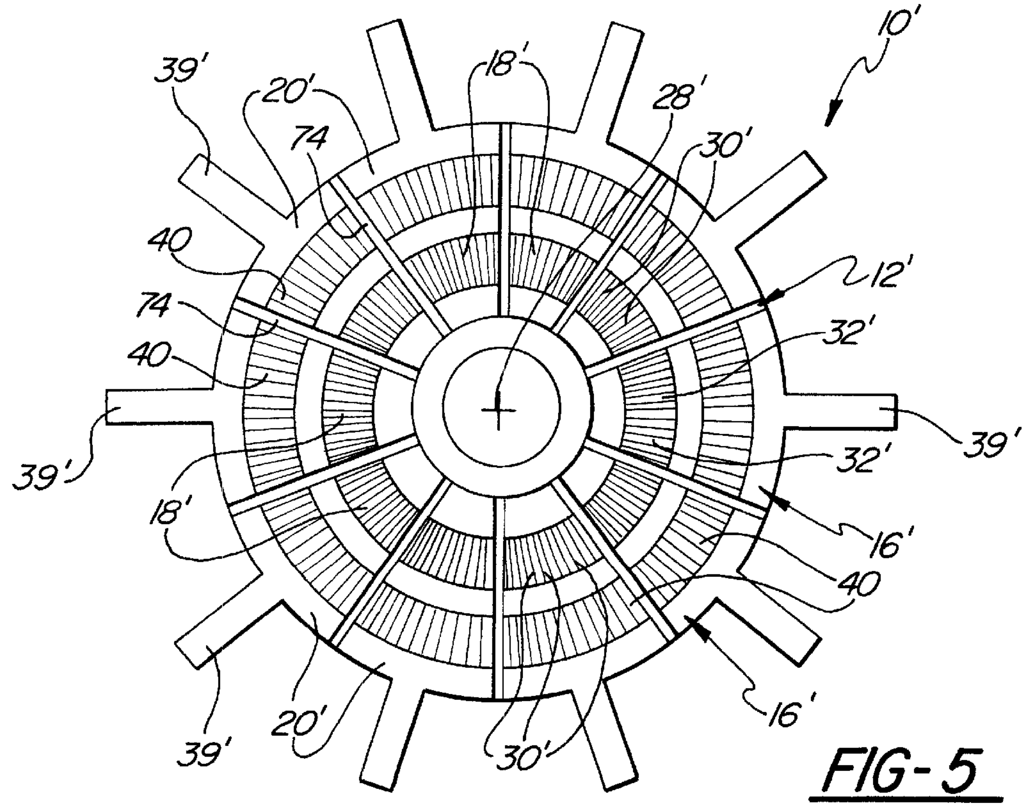
FIG-5

PLANAR COMMUTATOR SEGMENT ATTACHMENT METHOD AND ASSEMBLY

This Application is a Divisional Application of Ser. No. 09/629,922, now U.S. Pat. No. 6,359,362 filed on Jul. 31, 2000.

TECHNICAL FIELD

This invention relates generally to a planar "face" type carbon segment commutator assembly and a method of securing carbon commutator segments to a metallic conductor to make such an assembly.

BACKGROUND OF THE INVENTION

It is known for a planar carbon segment commutator to include metallic conductor sections supported in a circumferentially spaced array around an annular front surface of an annular hub comprising an insulating material. It is also known for such a commutator to include carbon commutator segments that are formed around and interlocked with portions of the respective metallic conductor sections. The carbon commutator segments define a flat composite commutating surface. An example of such a commutator is disclosed in U.S. Pat. No. 5,912,523, which issued Jun. 15, 1999 to Ziegler et al., is assigned to the assignee of the present invention and is incorporated herein by reference. To positively locate and secure the carbon segments they are embedded in the hub.

In addition, U.S. Pat. No. 5,925,962 issued Jul. 20, 1999 to Kobman et al. and the Ziegler patent both disclose overmolding carbon and insulator material onto a metallic substrate in the manufacturing process and pressing the overmolded carbon compound through holes in the metallic conductor sections to effect a more secure mechanical interlock between carbon segments and conductor sections.

What is needed is a planar commutator segment attachment assembly that supports and positively secures carbon commutator segments without overmolding hub material around the carbon segments or otherwise directly connecting the carbon segments to the hub. What is also needed is a more simple and inexpensive method of installing carbon segments in a commutator manufacturing process.

SUMMARY OF THE INVENTION

A planar commutator assembly is provided that includes an annular hub comprising electrical insulating material and a plurality of metallic conductor sections supported in an annular circumferentially-spaced array on the hub, each conductor section including a first front projection integrally extending from a front surface of each conductor section. The planar commutator assembly also includes a plurality of carbon commutator segments disposed on respective ones of the conductor sections and defining a flat composite annular front commutating surface. The front projections are disposed in cavities in corresponding commutator segments.

The first front projection of each conductor section has a first cross-section parallel to and adjacent the back surface of a corresponding commutator segment and a second cross-section parallel to and spaced axially forward of the first cross-section. The second cross-section has a greater area that the first cross-section to prevent withdrawal of the first front projection of each conductor section from its corresponding commutator segment. The first front projection of each conductor section mechanically locks one of the commutator segments to the conductor section. The first front projections provide positive mechanical locks that obviate the need to further secure the commutator segments by such means as partially embedding them in the hub.

The invention also includes a method for making a planar commutator that includes forming an annular conductor substrate including a first circular front projection that extends integrally and axially from a front surface of the substrate. An annular carbon disk is formed on the conductor substrate by overmolding a carbon compound onto the front surface of the conductor substrate and around the first circular front projection. The compound is then allowed to harden. An annular hub comprising an insulating material is then provided and the conductor substrate is connected to a front surface of the hub. Electrically isolated, circumferentially-spaced commutator segments and corresponding mechanically interlocked conductor sections are then formed by providing radial cuts through the annular carbon disk and the metal substrate, respectively.

BRIEF DESCRIPTION OF THE DRAWINGS

These and other features and advantages of the invention will become apparent to those skilled in the art in connection with the following detailed description and drawings, in which:

FIG. 3 is a front view of the assembly of FIG. 1 with the commutator segments removed to reveal conductor sections of the assembly;

FIG. 5 is a front view of the assembly of FIG. 4 with the commutator segments removed to reveal conductor sections of the assembly;

DETAILED DESCRIPTION

Figure 1:
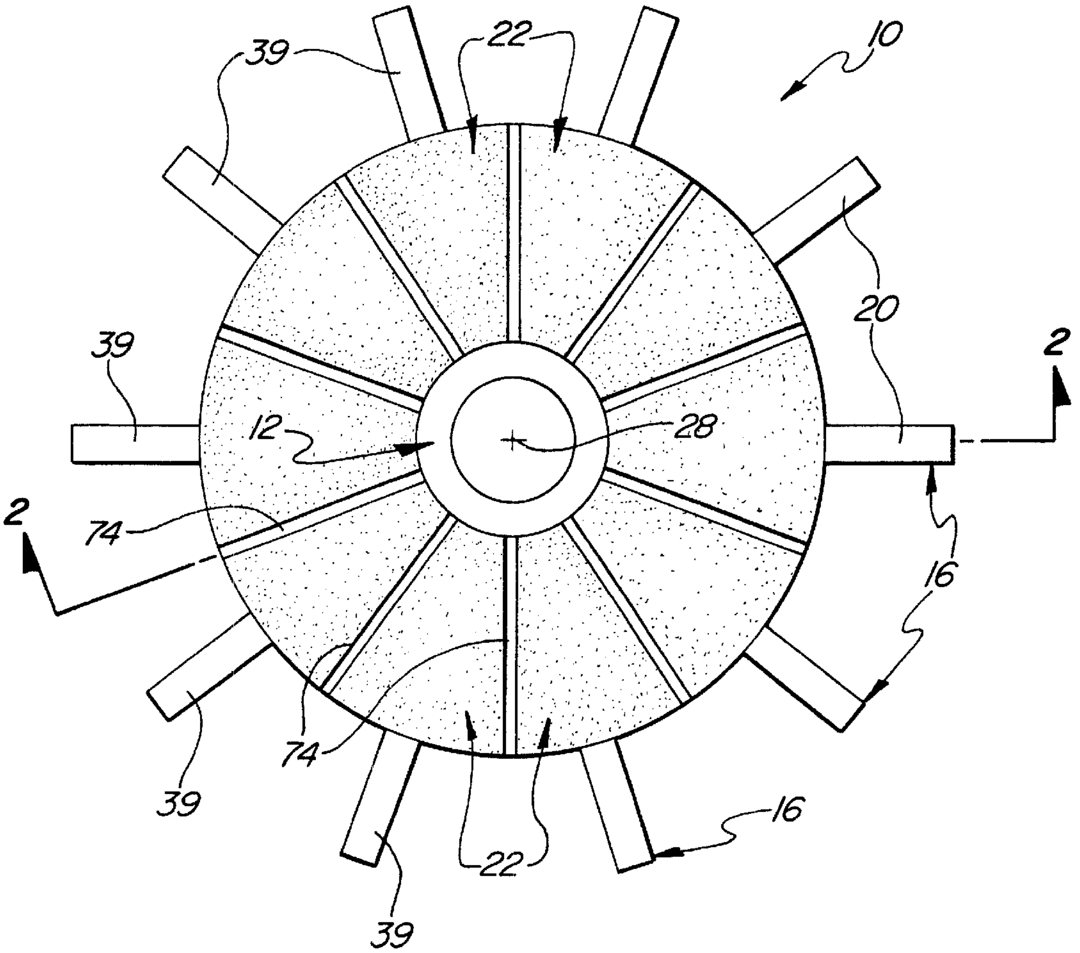
FIG. 1 is a front view of a planar commutator assembly constructed according to the invention.
Figure 2:
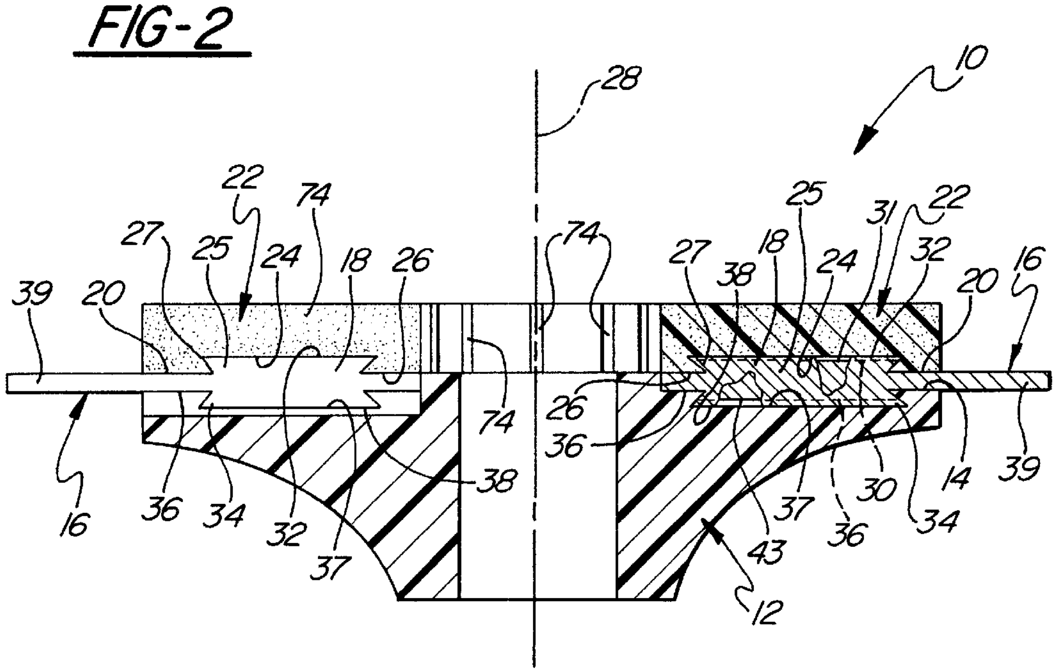
FIG. 2 is a cross-sectional side view of the assembly of FIG. 1 taken along line 2—2 of FIG. 1.

A planar or "face-type" carbon segment commutator assembly is generally shown at 10 in FIGS. 1–3. A second embodiment of the commutator segment attachment assembly is shown at 10' in FIGS. 4 and 5. Reference numerals with the designation prime (') in FIGS. 4 and 5 indicate alternative configurations of elements that also appear in the first embodiment. Unless indicated otherwise, where a portion of the following description uses a reference numeral to refer to the Figures, that portion of the description applies equally to elements designated by primed numerals in FIGS. 4 and 5.

The assembly 10 includes an annular hub 12 comprising electrical insulating material and having a generally flat annular front surface 14. The hub 12 includes a central rotational hub axis shown at 28 in FIGS. 1, 2 and 3. The assembly 10 also includes a plurality of metallic conductor sections 16 supported on the hub 12 in an annular circumferentially spaced array around the front surface 14 of the hub 12 as is best shown in FIG. 3. Each conductor section 16 includes a first annular front projection 18 integrally extending from a front surface 20 of each conductor section 16.

The assembly 10 also includes a plurality of carbon commutator segments 22 supported on and mechanically interlocked with respective ones of the conductor sections 16 and defining a flat annular front composite commutating surface. The front projections 18 of the conductor sections 16 are embedded within their corresponding commutator segments 22. In other words, the front projections 18 are disposed within complementary cavities 24 formed into back surfaces 26 of the corresponding commutator segments 22 that are supported on the conductor sections 16.

Figure 7:
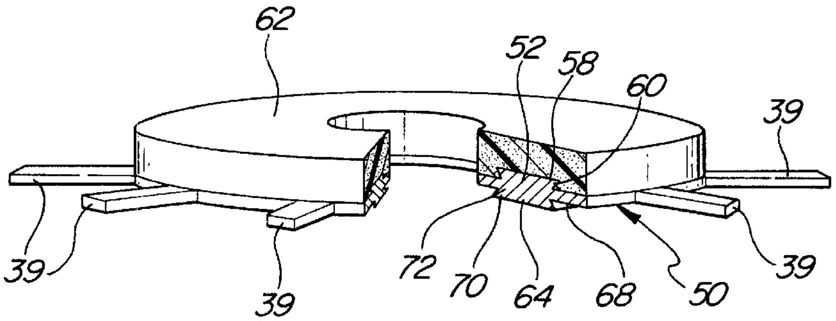
FIG. 7 is a partially cut-away side perspective view of a carbon disk formed onto the conductor substrate of FIG. 6 and from which the commutator segments are formed in constructing a planar carbon commutator according to the invention.
Figure 8:
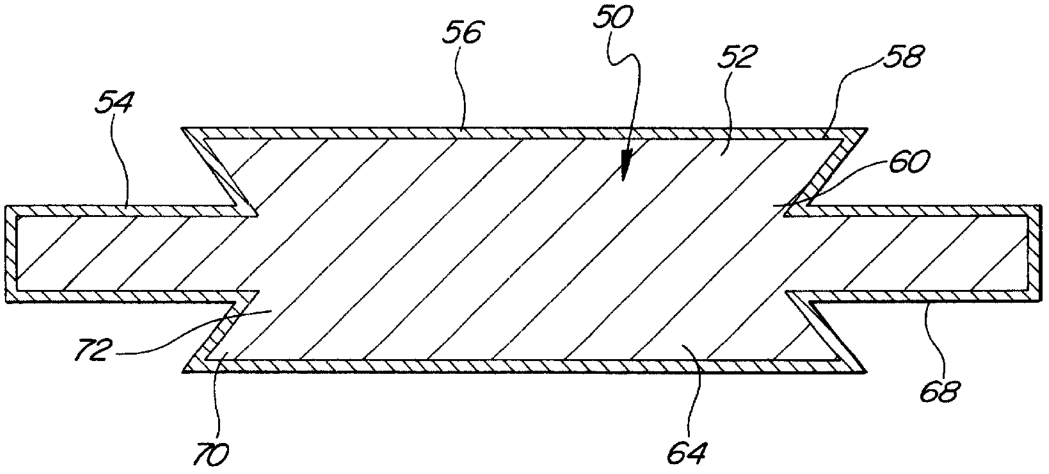
FIG. 8 is a magnified cross-sectional view of the conductor substrate as shown in the cut-away portion of FIG. 6 within circle 8.

As best shown in FIG. 8, the front projection 18 of each conductor section 16 has "dove tail" configuration and the commutator segment cavity 24 corresponding to each conductor section 16 has a complementary dove tail configuration. More specifically, the first front projection 18 of each conductor has the shape of an arcuate trapezoidal prism and fits within an arcuate trapezoidal prism shaped cavity 24 in a corresponding commutating segment 22 as shown in FIGS. 2 and 7. Therefore, as best shown in FIG. 2, the first front projection 18 of each conductor section 16 includes a narrow neck or base end 25 having a first cross section parallel to and adjacent the back surface 26 of a corresponding commutator segment 22 and also includes a wide distal end 27 having a second cross section parallel to and spaced axially forward of the first cross section. The second cross section has a greater area than the first cross section which prevents withdrawal of the first front projection 18 of each conductor section 16 from its corresponding commutator segment 22 and mechanically locks the commutator segments 22 to their corresponding supporting conductor sections 16. This interlocking dove tail arrangement provides a positive mechanical lock that obviates the need to further secure the commutator segments 22 by such means as partially embedding them in the hub 12.

The front projections 18 of the conductor sections 16 together define a segmented composite ring of front projections 18 as is best shown in FIG. 3. The ring of front projections 18 is co-axially disposed relative to the hub axis 28. The conductor section front projections 18 are oriented such that their trapezoidal cross sections are disposed vertically and radially relative to the hub axis 28. In other words, vertical planes passing through the hub axis 28 and through each conductor section 16 would define the trapezoidal cross section through each conductor section front projection 18.

The front projection 18 of each conductor section 16 includes surface discontinuities in the form of grooves 30 formed into a front face 32 of each front projection 18 disposed at a distal end 27 of each front projection 18. The grooves 30 are oriented radially relative to the hub axis 28. Each carbon segment 22 includes corresponding discontinuities in the form of grooves 31 formed into the front surfaces 24 of each carbon segment cavity 24. The grooves in the front surface of each carbon segment cavity 24 complement and engage the grooves 30 of the corresponding conductor section 16 projections. The interlocking radial grooves 30, 31 in the carbon segments 22 and conductor sections 16 prevent the commutator segments 22 from sliding circumferentially on their corresponding conductor projection sections 16.

Each conductor section 16 includes an integral back projection 34 that integrally extends from a back surface 36 of each conductor section 16. The back projection 34 of each conductor section 16 is disposed in a complementary cavity 37 formed into the front surface 14 of the hub 12 to positively secure the conductor sections 16 to the hub 12.

The back projection 34 of each conductor section 16 is generally identical to the front projection 18 of each conductor section 16 shown in FIG. 2. As with the front projection 18 of each conductor section 16, the back projection 34 of each conductor section 16 includes grooves 36. The grooves 36 are formed into a back surface 38 of each back projection 34 and define a distal end of each back projection 34. The grooves 36 in the back projection 34 are oriented radially relative to the hub axis 28. The hub 12 includes corresponding discontinuities in the form of grooves 43 formed into a front surface of each hub cavity 37. The grooves 43 in the front surface of each hub cavity 37 complement and engage the grooves 36 of the corresponding conductor section back projections 34. The interlocking radial grooves 36, 43 in the hub cavities 37 and back projections 34 prevent the conductor sections 16 from sliding circumferentially on the hub 12.

Each conductor section 16 also includes an axially outwardly extending tang 39. The tangs 39 are configured to support coil wires electrically connected to the tangs 39 by means such as soldering.

Figure 4:
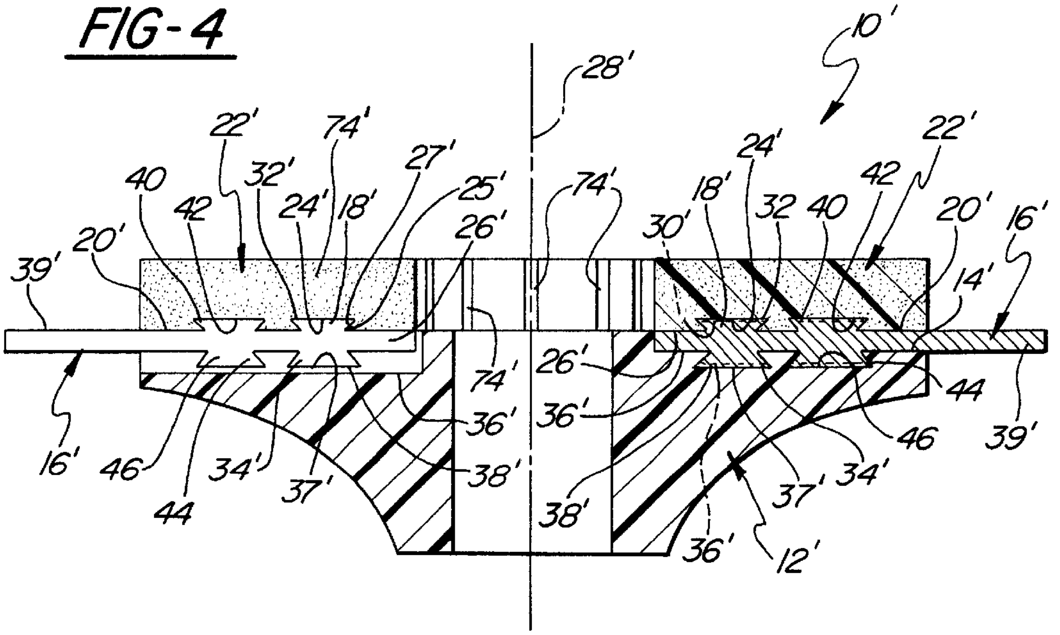
FIG. 4 is a cross-sectional side view of an alternative embodiment of the assembly of FIG. 1.

According to the second embodiment of the assembly shown at 10' in FIGS. 4 and 5, a second front projection 40 extends from the front surface 20' of each conductor section 16' and engages a complementary recess 42 in the back surface 26' of a corresponding carbon segment 22'. The second front projections 40 further secure carbon segments 22' to their respective conductor sections 16'. The second front projections 40 of the conductor sections 16' together define a second segmented composite front projection ring concentrically disposed relative to the first front projection 24 ring as is best shown in FIG. 4. As with the first front projections 18' the second front projections 40 have the general shape of arcuate trapezoidal prisms.

According to the second embodiment of FIGS. 4 and 5 a second back projection 44 extends from the back surface 26' of each conductor section 16' and engages a complementary recess 46 in the front surface 14' of the hub 12'. The second back projection 44 in each conductor section 16' further secures the conductor sections 16' to the hub 12'. The second back projections 44 of the conductor sections 16' together define a second segmented composite back projection ring concentrically disposed relative to the first back projection ring 18'. The second back projection ring is generally identical to the second front projection 52 ring and has the same trapezoidal cross section and arcuate trapezoidal prismatic shape as the second front projection 18.

Figure 6:
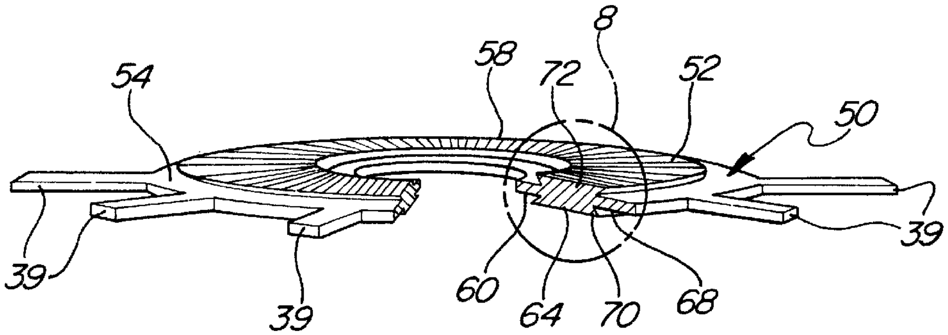
FIG. 6 is a partially cut-away side perspective view of a conductor substrate from which the conductor segments are formed in constructing a planar carbon commutator according to the invention.

In practice, a planar or "face" type carbon segment commutator can be made by first forming an annular conductor substrate as is best shown at 50 in FIGS. 6 and 7. The conductor substrate 50 has a first annular or ring-shaped front projection 52 extending integrally and axially from a front surface 54 of the conductor substrate 50. The annular conductor substrate 50 may be formed by casting the conductor substrate 50 from a first metallic material or by stamping the conductor substrate 50 from a copper blank or a blank comprising another suitable metal. A metallic coating, shown at 56 in FIG. 8, may also be provided on the first metallic material. In this case, the coating preferably comprises a metallic material, such as copper, that is more conductive than the first metallic material. In forming the annular conductor substrate 50, first circular front projection 52 is formed to have a continuous trapezoidal cross section around its circular length such that an axial distal end 58 of the front projection 52 is wider than a base end 60 of the front projection 52.

As shown in FIG. 7, an annular carbon disk 62 is then formed on the conductor substrate 50 by over-molding a carbon compound onto the front surface 54 of the conductor substrate 50 and around the first circular front projection 52. The carbon compound may be formed onto the front surface 54 of the conductor substrate 50 by any suitable means known in the art such as injection molding or compression molding. The carbon disk 62 may either be pressed to size before hardening or may be machined to dimension after hardening. In either case, when the carbon compound is allowed to harden after molding it forms a mechanical interlock with the conductor substrate 50.

The carbon disk 62 may be formed of a "standard" carbon formulation such as Ringsdorf EK23 which has a specific electrical resistance of 300–450 $\mu\Omega$ and is commercially available from SGL Carbon GmbH, of Bonn, Germany. The disk 62 may alternatively be formed of an elecrographitic grade of carbon having better electrical properties. In either case, matching brush materials with commutator materials improves performance.

In forming the conductor substrate 50, a first circular back projection 64 is also formed and extends integrally and axially from a back surface 68 of the conductor substrate 50 axially opposite the front surface 54 of the conductor substrate 50. The first circular back projection 64 is formed to be generally identical to the first circular front projection 52 and therefore has a continuous trapezoidal cross section having a distal end 70 that is wider than a base end 72 of the projection 64.

The hub 12 is then formed by compression molding an insulating material such as phenolic resin onto the back surface 68 of the metal conductor substrate 50 and around the first circular back projection 64. The insulating material is allowed to harden and form a mechanical interlock with the metal conductor substrate 50. In other embodiments the hub 12 may be formed from any suitable high-strength moldable plastic.

Radial cuts, shown at 74 in FIGS. 1–3, are then formed through both the annular carbon disk and the metal conductor substrate 50. The radial cuts 74 form the electrically isolated, circumferentially spaced commutator segments 22 and their corresponding mechanically interlocked conductor sections 16.

The formation of the conductor substrate 50 may also include the formation of a second circular front projection and a second circular back projection as shown in segmented form in FIGS. 4 and 5. The second circular front projection is formed to be concentric with the first circular front projection 52 and carbon compound is compression molded around both the first and the second circular front projection. The second circular back projection is generally identical to the second circular front projection and extends integrally and axially from the back surface of the conductor substrate 50 concentric with the first circular back projection 64. As with the first circular back projection 64 the second circular back projection has a continuous trapezoidal cross section with the distal end cross sectional area greater than the base end cross sectional area. The hub 12 insulating area is compression molded around both the first and the second back projections and onto the back surface 68 of the metal conductor substrate 50.

A planar carbon commutator constructed according to the present invention provides secure mechanical interlocks between carbon segments 22 conductor sections 16 and the hub 12, a highly conductive electrical connection between carbon segments 22 and conductor sections 16, and provides a robust, easy to manufacture design.

This description is intended to illustrate certain embodiments of the invention rather than to limit the invention. Therefore, it uses descriptive rather than limiting words. Obviously, it's possible to modify this invention from what the description teaches. Within the scope of the claims, one may practice the invention other and as described.

What is claimed is:

1. A method for making a planar carbon segment commutator that includes a plurality of metallic conductor sections supported in an annular circumferentially-spaced array on a hub comprising electrical insulating material, each conductor section including a first front projection integrally extending from a front surface of each conductor section and embedded in one of a plurality of carbon commutator segments, the commutator segments defining a flat composite annular front commutating surface; the method including the steps of:

- forming an annular conductor substrate with a first annular front projection extending integrally and axially from a front surface of the substrate;
- forming an annular carbon disk on the conductor substrate by overmolding a carbon compound onto the front surface of the conductor substrate and around the first annular front projection and allowing the compound to harden;
- providing an annular hub comprising an insulating material;
- connecting the conductor substrate to a front surface of the hub; and
- forming electrically isolated, circumferentially spaced commutator segments and corresponding mechanically interlocked conductor sections by forming radial cuts through the annular carbon disk and the metal substrate, respectively.

2. The method of claim 1 in which the step of forming the annular conductor substrate includes:

- casting the conductor substrate from a first metallic material; and
- stamping the conductor substrate from a metal blank.

3. The method of claim 1 in which the step of forming the annular conductor substrate includes providing a coating on the first metallic material, the coating comprising a metallic material more conductive than the first metallic material.

4. The method of claim 1 in which the step of forming the annular conductor substrate includes forming the first annular front projection to include a distal end cross-sectional area greater than a base end cross sectional area of the first front projection.

5. The method of claim 1 in which the step of forming an annular carbon disk on the conductor substrate includes compression molding carbon onto the front surface of the conductor substrate and around the first annular front projection.

6. The method of claim 1 in which:

- the step of forming the conductor substrate includes forming a second annular front projection concentric with the first annular front projection; and
- the step of forming an annular carbon disk on the conductor substrate includes molding carbon around the second annular front projection.

7. The method of claim 1 in which the step of forming a conductor substrate includes forming a first circular back projection that extends integrally and axially from a back surface of the substrate.

8. The method of claim 7 in which:

the step of forming the first circular back projection includes forming a circular back projection having a distal end cross-sectional area greater than a base end cross sectional area of the first front projection; and the steps of providing a hub and connecting the conductor substrate to the hub include molding insulating material onto the back surface of the metal substrate and around the first circular back projection.

9. The method of claim 7 in which the step of forming a conductor substrate includes forming a second circular back projection that extends integrally and axially from the back surface of the substrate and is concentric with the first circular back projection.

10. The method of claim 9 in which:

the step of forming the second back projection includes forming a second back projection having a distal end cross-sectional area greater than a base end cross sectional area of the first front projection; and the steps of providing a hub and connecting the conductor substrate to the hub include compression molding insulating material onto the back surface of the metal substrate and around the second circular back projection.

* * * * *